US012298755B2

(12) United States Patent
Koh et al.

(10) Patent No.: US 12,298,755 B2
(45) Date of Patent: May 13, 2025

(54) METHOD AND SYSTEM FOR AUTOMATED FAULT DETECTION

(71) Applicant: Yokogawa Electric Corporation, Tokyo (JP)

(72) Inventors: Jia Xuan Koh, Bedok (SG); Kaushik Ghosh, Bedok (SG); Saurabh Bhandari, Bedok (SG); Gokula Krishnan Sivaprakasam, Bedok (SG)

(73) Assignee: Yokogawa Electric Corporation, Tokyo (JP)

( * ) Notice: Subject to any disclaimer, the term of this patent is extended or adjusted under 35 U.S.C. 154(b) by 179 days.

(21) Appl. No.: 17/705,144

(22) Filed: Mar. 25, 2022

(65) Prior Publication Data
US 2023/0305551 A1  Sep. 28, 2023

(51) Int. Cl.
*G05B 23/02* (2006.01)
(52) U.S. Cl.
CPC ..... *G05B 23/0275* (2013.01); *G05B 23/0221* (2013.01); *G05B 23/024* (2013.01)
(58) Field of Classification Search
CPC ............ G05B 23/0275; G05B 23/0221; G05B 23/024
See application file for complete search history.

(56) References Cited

U.S. PATENT DOCUMENTS

| 11,740,157 | B1 * | 8/2023 | Nguyen | G01M 13/00 700/282 |
| 2002/0066054 | A1 * | 5/2002 | Jaw | G05B 9/03 714/48 |
| 2005/0271499 | A1 * | 12/2005 | Loy | F01D 25/04 415/1 |
| 2009/0037772 | A1 * | 2/2009 | Wegerich | G05B 23/0254 714/E11.002 |

(Continued)

FOREIGN PATENT DOCUMENTS

| CN | 107301884 A | * | 10/2017 | |
| CN | 213980887 U | * | 8/2021 | F01D 21/003 |
| WO | WO-2013065807 A1 | * | 5/2013 | F01D 1/06 |

OTHER PUBLICATIONS

Machine translation for WO-2013065807-A1, downloaded Nov. 2023 (Year: 2023).*

(Continued)

*Primary Examiner* — John C Kuan
(74) *Attorney, Agent, or Firm* — Sheridan Ross P.C.

(57) ABSTRACT

Methods, systems, and computer program products for automated fault monitoring and detection in a system. The fault detection method comprising receiving real-time device measurement data from a plurality of input and/or output devices in the system; identifying at least one relationship that correlates the real-time device measurement data to a set of parameters that define operation of the system; calculating a performance indicator for the system based on the (Continued)

real-time device measurement data using the identified at least one relationship; and if the performance indicator is outside a predetermined range, then an anomaly is detected in the system. The fault detection method further comprises: identifying a faulty device among the plurality of input and/or output devices; and reporting the identified faulty device.

19 Claims, 6 Drawing Sheets

(56) References Cited

U.S. PATENT DOCUMENTS

| | | | | |
|---|---|---|---|---|
| 2012/0041663 | A1* | 2/2012 | Suzuki | E02F 9/267 |
| | | | | 701/102 |
| 2015/0095003 | A1* | 4/2015 | Horowitz | G05B 17/02 |
| | | | | 703/6 |
| 2016/0203036 | A1 | 7/2016 | Mezic et al. | |
| 2016/0320768 | A1 | 11/2016 | Zhao et al. | |
| 2019/0128192 | A1* | 5/2019 | Panov | G05B 23/0283 |
| 2022/0341996 | A1* | 10/2022 | Sun | G06N 3/0985 |
| 2023/0289965 | A1* | 9/2023 | Ishii | G16H 30/20 |
| | | | | 382/128 |

OTHER PUBLICATIONS

Machine translation for CN-213980887-U, downloaded Nov. 2023 (Year: 2023).*

Machine translation for CN-107301884-A, downloaded Nov. 2023 (Year: 2023).*

Sarkar et al., "Practical Machine Learning with Python" Apress, 2018 (Year: 2018).*

Biswas et al. "A Method for Fault Detection in Wireless Sensor Network Based on Pearson's Correlation Coefficient and Support Vector Machine Classification," Research Square, Jul. 2021, 18 pages [retrieved online Oct. 5, 2022 from: https://assets.researchsquare.com/files/rs-380070/v1_covered.pdf?c=1631872531].

* cited by examiner

METHOD AND SYSTEM FOR AUTOMATED FAULT DETECTION

FIELD OF THE DISCLOSURE

The present disclosure is generally towards the automated fault/anomaly detection and more particularly toward detection of a faulty device within a system, based on correlating real-time device measurement data to simulated device measurements using one or more relationships that represent optimal operation of the system.

BACKGROUND

Industrial environments, for example environments for manufacturing, production, extraction, construction, energy production, and others, involve complex systems and devices, which may malfunction (e.g., a sensor fails). The conventional method for detecting faults/anomalies in a system is via observation of the input and output devices. Existing methods of anomaly detection are computationally expensive and time consuming since a single site may have numerous systems with multiple input/output devices.

SUMMARY

Assuming that each sensor in a system can hold 100 possible values, in a system with ten sensors there will be $100^{10}=10^{20}$ possible states. In reality, each sensor or device can hold more than 100 possible values, creating an almost infinitely large number of states. Therefore, the biggest difficulty for an anomaly detection system for a high number of correlated sensors, is the large number of states.

Instead of observing each device within a system, anomalies may be detected by applying certain principles to generate relationships between multiple parameters that represent the desired performance of a system. Systems may be predicted to behave according to certain principles including, mass balance and energy balance. Operation of the system may be further defined by parameters related to flow, temperature, pressure, power, etc. There might be multiple relationships identified in the system based on a domain understanding of the system operation. By summarizing a system intelligently via a series of identified relationships, the present disclosure provides a faster, more cost-efficient, and scalable solution to detect an anomaly/fault in a system.

Embodiments of the present disclosure seek to automate fault/anomaly detection in a system based on the processing and analysis of real-time device measurements. More specifically, a performance indicator for the system is calculated, the performance indicator is determined by applying one or more relationships that define operation of the system to the real-time device measurements. Detection of a faulty device within a system may trigger alerts or alarms for remedial actions.

The claimed invention of fault/anomaly detection is based on identifying first principles such as mass balance and energy balance, and constructing a series of relationships to describe the operation of the system. At regular time intervals, a performance indicator relating to actual values (e.g., real-time device measurement data) of a system are calculated using one of the constructed relationships, and compared with a predetermined range. If the performance indicator is outside of a predetermined range, the claimed system will detect a fault in the system. In embodiments, the claimed system and process may further identify the faulty device (e.g., a faulty sensor) in the system. In embodiments, the system triggers an alert that an anomaly/fault has been detected.

Furthermore, as the identified relationships are able to infer new states of the system, which enable new previously unseen/unknown states (e.g., a new setting of inlet flow, temperature, and/or pressure not previously used by the automation or process system) to be identified properly, thus it improves the accuracy rate of determining normality or anomaly, as it would not classify sensor as anomalous if there is an expected adjustment in the process.

For example, if there are data points for temperature, pressure, and flow of an inlet at 200 Celsius, 150 kPa, and 50 m3/h; and 300 Celsius, 150 kPa, and 50 m3/h are used to identify a relationship, the relationship will be able to interpolate missing values and determine if a new data point with an unseen state of 250 Celsius, 150 kPa, and 50 m3/h is normal or anomalous (even if the temperature is different).

It is, therefore, an aspect of the present disclosure to provide a method of perform automated fault detection of a system. More specifically, the method comprising: receiving real-time device measurement data from a plurality of input and/or output devices in the system; identifying at least one relationship that correlates the real-time device measurement data to a set of parameters that define operation of the system; calculating a performance indicator for the system based on the real-time device measurement data using the identified at least one relationship; if the performance indicator is outside a predetermined range, then an anomaly is detected in the system; and in response to detecting the anomaly, performing an analysis using the performance indicator and the real-time device measurement, to identify a faulty device in the system. It is also an aspect of the present disclosure to use machine learning to develop models to identify the relationships among the measurements (e.g., any linear or non-linear combination of the measurements) for detecting anomalies in a system.

In another embodiment, a system to perform automated monitoring of an energy system, the system comprising: a receiver configured to receive real-time device measurement data from a plurality of input and/or output devices in the energy system; and a processor configured to: identify at least one relationship that correlates the real-time device measurement data to a set of parameters that define operation of the energy system; calculate a performance indicator for the energy system based on the real device measurement data using the at least one relationship; in response to the performance indicator being outside a predetermined range, indicating that an anomaly is detected in the energy system; perform an analysis using the performance indicator and the real-time device measurement data, to identify a faulty device in the energy system; and report the identified faulty device to a communication device.

In another embodiment, a method to perform automated monitoring of a system, the method comprising: receiving real-time device measurement data from a plurality of input and/or output devices in the system; identifying at least one relationship that correlates the real-time device measurement data to a set of parameters that define operation of the system; calculating a performance indicator for the system based on the real-time device measurement data using the identified at least one relationship; and if the performance indicator is outside a predetermined range, then an anomaly is detected in the system.

Aspects of any one or more of the foregoing embodiments include the set of parameters that define the operation of the system relate to at least one of the following: flow, temperature, pressure and/or power.

Aspects of any one or more of the foregoing embodiments include the set of parameters that define the operation of the system comprises simulated device measurements.

Aspects of any one or more of the foregoing embodiments include the set of parameters are determined based on principles including at least one of: mass balance and energy balance.

Aspects of any one or more of the foregoing embodiments include the predetermined range is determined in accordance with an accuracy rate of determining normality or anomaly.

Aspects of any one or more of the foregoing embodiments include the analysis includes applying a changing time window to determine a Pearson Correlation Coefficient between the real-time device measurement and the performance indicator across at least one time interval.

Aspects of any one or more of the foregoing embodiments include at least one of the plurality of input and/or output devices comprises a sensor.

Aspects of any one or more of the foregoing embodiments include at least one of the plurality of input and/or output devices comprises at least one of: a temperature sensor, a pressure sensor, or a flow sensor.

Aspects of any one or more of the foregoing embodiments include at least a portion of the real-time device measurement data comprises converted energy data and outputted energy data.

Aspects of any one or more of the foregoing embodiments include at least a portion of the real-time device measurement data comprises power generated data.

Aspects of any one or more of the foregoing embodiments include identifying at least one relationship where an average value of a feature related to the at least one relationship has a normal distribution over a time interval.

Aspects of any one or more of the foregoing embodiments include the faulty device comprises a sensor in the system.

Aspects of any one or more of the foregoing embodiments include the system comprises a two-stage steam turbine generator system.

Aspects of any one or more of the foregoing embodiments include the system comprises one of: a hydroelectric machine, a steam turbine, a wind turbine, a compressor, or a pump.

A computer implemented method including any one or more of the above embodiments or aspects of the embodiments described herein.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects of the embodiments, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The term "fault," "defect," "anomaly," or "anomalous event" and variations thereof, as used herein, refers to an event or state that deviates from or fails to conform to an expected or desired process state or component state within a process environment.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The present disclosure is described in conjunction with the appended figures.

DETAILED DESCRIPTION

Figure 1:
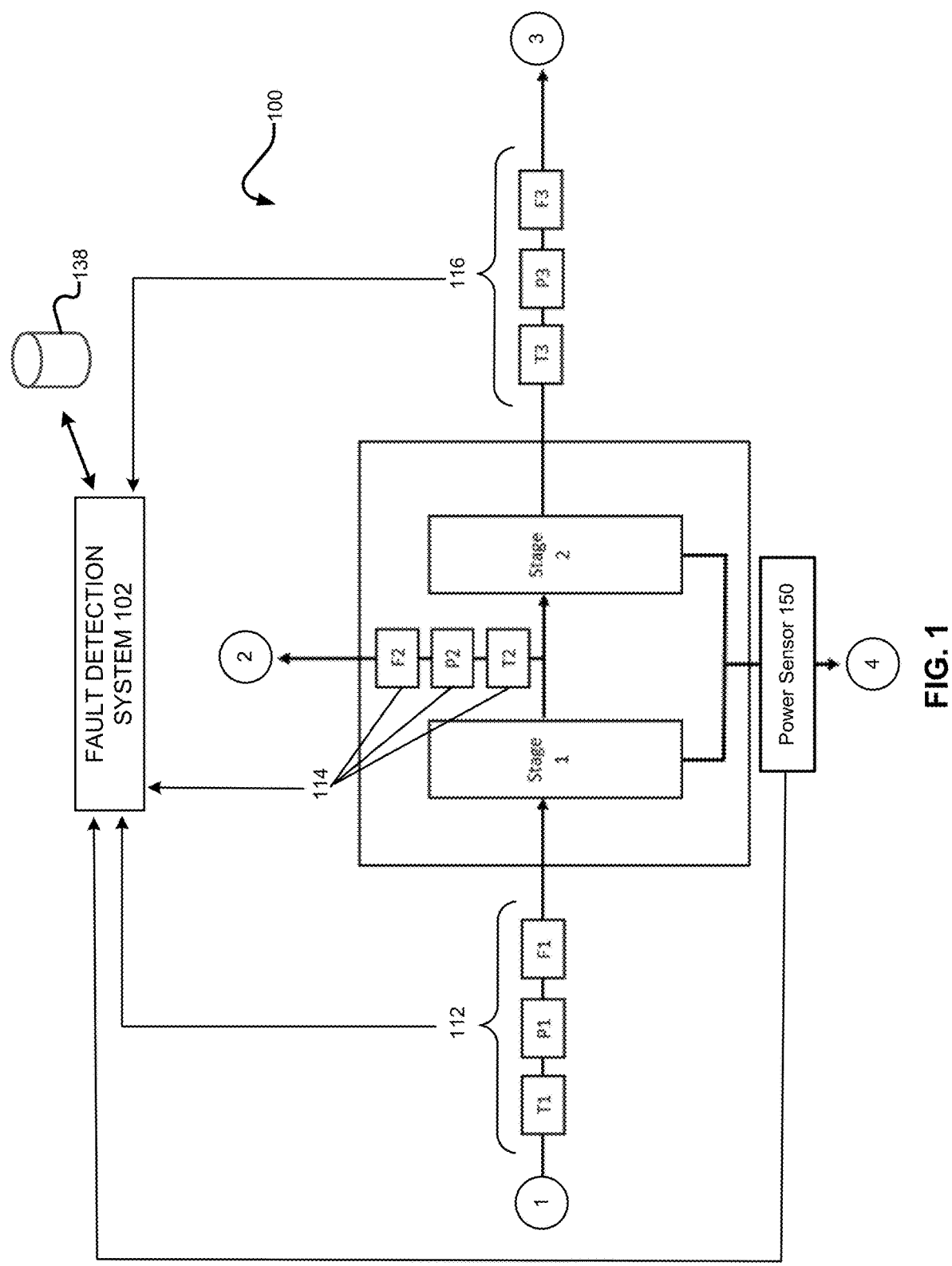
FIG. 1 illustrates an example system 100 for automated fault detection in accordance with embodiments of the present disclosure.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

It should be appreciated that embodiments of the present disclosure can be utilized in numerous computing environments such as WIFI networks and multi-link subnet networks.

Furthermore, while the illustrative embodiments herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates an example automation or process system 100 in accordance with embodiments of the present disclosure. For example, system 100 may comprise a two-stage steam turbine generator or other systems. At inlet (1) the inlet steam enters the 1st stage, causing a turbine to spin and generate power. Potential energy of the steam is converted into kinetic energy in the rotating turbine, which is then converted into an electric current via a generator. Inlet (1) has input devices (e.g., sensors 112) that measure the state of the inlet at regular intervals of time. These input devices includes sensors such as: Temperature sensor (T1), which measures the temperature of the steam, Pressure sensor (P1), which measures the pressure of the steam, and Flow sensor (F1), which measures the flow rate of the inlet steam.

After the 1st stage, a portion of potential energy is successfully converted into power. A fraction of this steam is expelled in outlet (2) while the remaining steam is sent into the 2nd stage. There are output devices (e.g., sensors 114) measuring the temperature (T2), pressure (P2), and flow (F2) of this outlet stream.

Another set of turbines in the 2nd stage generates additional power from the steam. Finally, the remaining steam flows out via outlet (3). There are output devices (e.g., sensors 116) measuring temperature (T3), pressure (P3), and flow (F3) of this outlet stream. Electrical energy generated from the 1st stage and 2nd stage is used downstream for other purposes, and the total energy generated per time for both stages is measured with a Power Sensor 150 and outputted in outlet (4).

In total, there are ten parameters (T1-3, P1-3, F1-3, and Power), one parameter for each device, in this automation or process system 100. T1, P1, and F1 are the values for the inlet steam flow entering the two-stage steam turbine generator 100; T2, P2, and F2 are the values for the outlet steam flow leaving the 1st stage of the two-stage steam turbine generator 100; T3, P3, and F3 are the values for the outlet steam flow leaving the 2nd stage of the two-stage steam turbine generator 100; and power is a value recording the total power generation from both stages of the two-stage steam turbine generator 100. The real-time measurements for T1-3, P1-3, F1-3, and Power are transferred to a fault detection system 102.

The fault detection system 102 receives the real-time device measurements for T1-3, P1-3, F1-3 and Power; and identifies at least one relationship that correlates the real-time device measurements for T1-3, P1-3, F1-3 and Power.

For instance, based on first principles of mass balance, in a two-stage steam turbine generator, the steam flow rate parameter of the inflow (F1) must be equal to the outflows (F2 and F3). Based on this principle, we can construct a relationship as such:

$$F1=F2+F3$$

Therefore, if any of the flow sensors are anomalous, then this relationship will be not hold. That is to say, if one of the sensors (F1, F2, F3) is reading incorrectly (e.g., higher or lower) then F1≠F2+F3. Furthermore, an error feature (E1) can be determined with the following equation:

$$E1=F1-F2-F3$$

It would be well understood that an error feature is created based on an identified relationship of parameters from input and output devices (e.g., sensors). In the current case, the error feature (E1) equals the remainder of the steam flow rate parameter of the inflow (F1) subtracting the steam flow rate parameter of the outflows (F2 and F3).

In an ideal scenario, the error feature (E1) will be zero or close to zero. Based on the performance requirements of the system, a suitable threshold (e.g., range) for the error feature (E1) to trigger detection of a fault is determined. For instance, if the false positive rate must be kept at 0.1% (e.g., for every 1000 predictions of anomalous events, only 1 is predicted wrongly), the system determines the largest (most positive) error feature ($E1_{max}$) where only 0.1/2=0.05% of good data is wrongly flagged as anomalous due to $E1>E1_{max}$, and the smallest (most negative) error feature (E1mira) where 0.05% of good data is flagged as anomalous due to $E1<E1_{min}$. Therefore, the system determines a range for the error feature $E1_{min}$-$E1_{max}$ that is acceptable based on the performance requirements, and an anomaly/fault is detected when the performance indicators in not within the determined range $E1_{min}$-$E1_{max}$.

Therefore, for a set of real-time device measurements, that is processed, if the error feature (E1) for this set of real-time device measurements falls within the range of $E1_{min}$-$E1_{max}$, it is deemed as a good set of data (e.g., no anomaly). If the error feature (E1) for the set of real-time device measurements is not within the range $E1_{min}$-$E1_{max}$, the set of real-time device measurements is deemed as anomalous (e.g., fault detected). In other words, the error feature (E1) can be used as a performance indicator. If the error feature (E1) is close to zero, the system follows the relationships (e.g., mass balance) well and is very unlikely to be anomalous. Conversely, if the error feature (E1) value is consistently high or increasing over time, this may indicate that the system is no longer function properly/optimally and may contain a faulty device providing anomalous device measurements.

In another example, the following relationship may represent the principle of energy balance in the system 100:

Inlet 1 potential energy=Outlet (2) potential energy+
Outlet (3) potential energy+Power generated (4)

It is understood that a higher flow, temperature, and pressure signifies higher potential energy in the stream.
Therefore, we can create a function as such:

$$F(T1,P1,F1)=\text{Power}+G(T2,P2,F2)+H(T3,P3,F3)$$

where F, G and H are functions containing a series of coefficients and parameters characterizing the state of inlet 1, outlet 2 and outlet 3 respectively.
Error feature E2 is calculated as:

$$E2=F(T1,P1,F1)-\text{Power}-G(T2,P2,F2)-H(T3,P3,F3)$$

In an ideal scenario, the error feature E2 will be zero or close to zero.
An example of a possible function F is:

$$F(T1,P1,F1)=k1*T1+k2*P1+k3*F1$$

where k1, k2 and k3 are coefficients to be determined and related to parameters T1, P1 and F1 respectively.
In this case the thermodynamic knowledge of how steam enthalpy varies with steam temperature, pressure and mass can be used to determine the form of the function F.

Figure 2:
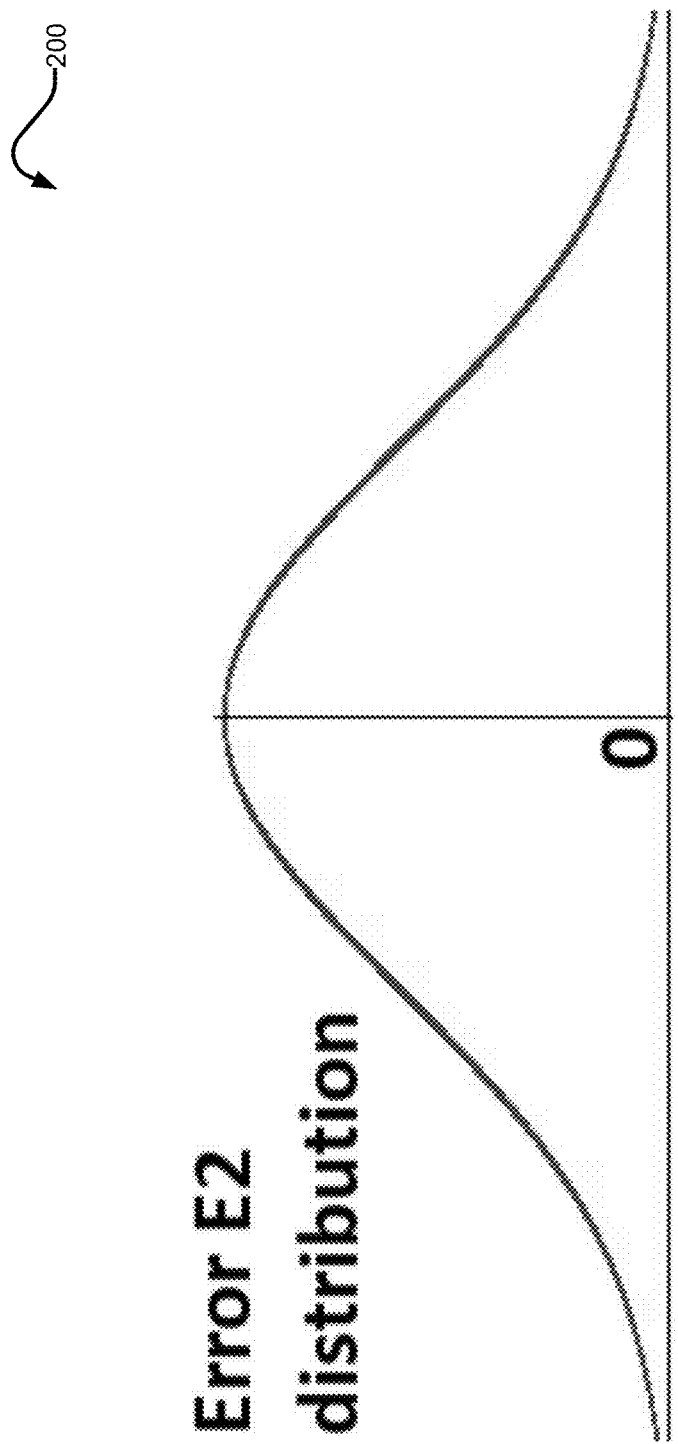
FIG. 2 illustrates an example error distribution in accordance with embodiments of the present disclosure.

For each relationship an average error is determined. By analyzing the magnitude of the average error and the distribution of error across all good data points, the system can determine if the relationship is precise enough to approximate the state of the system (e.g., approximating the energy balance of the steam turbine generator). In a well identified relationship, the average error is close to zero while the data distribution of error would tend to have a normal distribution with mean close to zero with a small standard deviation (see graph 200 in FIG. 2). Therefore, the lower the average error, the better the relationship is at characterizing and approximating the automation or process system. Therefore, the relationship(s) that best characterizes the performance of the system are the relationship(s) with the lowest average error. In embodiments, the relationship(s) that best characterize the performance of the system are selected by the fault detection system 102.

While the strength of each relationship relative to other relationships can be compared via the average error, the true assessment of the anomaly detection algorithm will be done by reviewing the accuracy rate of detecting anomalies from a training dataset.

For most automation or process systems, there might be multiple relationships identified based on domain understanding of the system, and hence multiple error features are generated. In this case of a two-stage steam turbine generator, instead of setting a threshold for a single error feature E1, machine learning models can be applied to identify the anomalies.

For example, for a system with ten sensors with two relationships and error features (E1 and E2), a series of input and output devices at any given time would be identified by a coordinate of (E1, E2). If a data point is good and not anomalous, it would be very close to the origin (0, 0). Therefore, this approach of generating error features based on identified relationships will create a large cluster of good data points near the origin point (0, 0), as illustrated in graph 300 of FIG. 3. In this case, machine learning models demonstrate a significantly higher level of accuracy in detecting new data points that fall far away from this cluster of good points centered around the origin, since a high E1 and/or E2 moves the data point away from the origin point (0, 0).

Once a relationship is determined, conventional mathematical optimization techniques with the objective to reduce E1 and E2 to zero for all training data points is used. After optimization is complete, this will calculate a set of coefficients k1, k2, k3, for the given relationships. Using these new coefficients, the absolute average error terms for E1 and E2 from all the good training points are calculated. For instance, if there are five sets of training points yielding error E2 with value 0, 1, −2, 3, −1 respectively, the average error E2=(|0|+|1|+|−2|+|3|+|−1|)/5=7/5=1.40. As a result, the optimization technique will generate a series of E2 values that are close to zero, resulting in the average E2 being minimized, and approximate the state of the system well. This calculation also applies to E1, and all error features derived from other relationships where applicable.

The input and output device parameters of automation or process systems (e.g., system 100) tend to be highly correlated and may have a large operating range, and hence it is difficult for machine learning models to detect anomalies, since there are many previously unseen/unknown states of the automation or process system that might arise in the future. For example, for a two-stage steam turbine generator, if the inlet flow was operating between 200-300 Celsius (Temperature) and 150-200 kPa (Pressure) previously and an engineer decides to adjust the settings of the system, the machine learning algorithm will likely flag an unknown inlet steam of 500 Celsius (Temperature) and 300 kPa (Pressure) as anomalous because the operating parameters fall outside of the expected operating range, when it is actually a normal state. With these challenges, the accuracy of machine learning models to detect anomalies are very low.

Furthermore, the training dataset of simulated or real-time measurements comprehensive enough to cover all states of the automation or process system would have to be extremely large. For example, assuming that each sensor in a system can hold 100 possible values, in a system with ten sensors there will be $100^{10}=10^{20}$ possible states. In reality, each sensor or device can hold more than 100 possible values, creating an almost infinitely large number of states. Therefore, the biggest difficulty for an anomaly detection system for a high number of correlated sensors, is the large number of states. It is highly impractical to obtain and store such a huge dataset, and computationally expensive to train the model using the large dataset.

Unlike conventional data driven methods for anomaly detection, where unknown/previously unseen data/data points are most often flagged as anomalous, the present disclosure provides accurate prediction results even for unknown/previously unseen data/data points as the underlying models are developed to capture the fundamental first principles relationships among the measurements that will hold true even for the unknown/previously unseen data.

Furthermore, to overcome the need for extremely large dataset for training, instead of training the models using a dataset of all possible state values for each device, the present disclosure identifies and constructs a series of relationships that models optimal operation of the system. These relationships will generate a set of intermediate features, which comprises a more manageable dataset for training machine learning models for anomaly detection. Furthermore, by creating an error feature based on the relationship(s), the error feature, may be used to train a machine learning model to determine if there is an anomaly/fault. For example, in the previously discussed example where the machine learning algorithm likely flags an unknown inlet steam of 500 Celsius (Temperature) and 300 kPa (Pressure) as anomalous because the operating parameters fall outside of the expected operating range, using techniques described in the present disclosure, the data point at 500 C and 300 kPa would no longer detected as anomalous.

Figure 3:
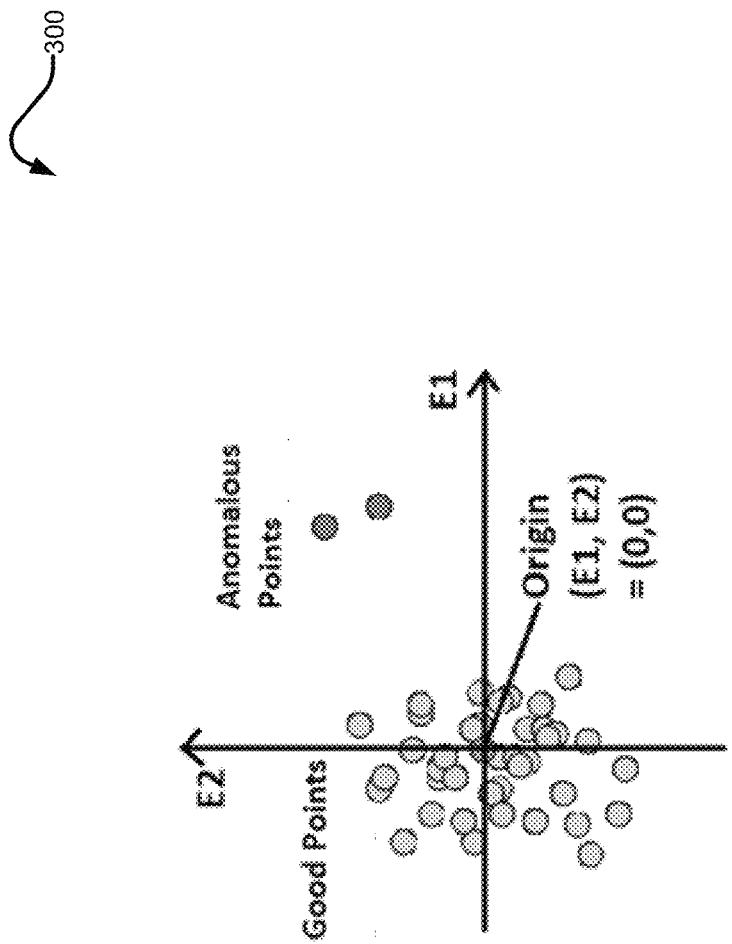
FIG. 3 illustrates an example series of error features in accordance with embodiments of the present disclosure.

FIG. 3 illustrates an example series of error features. In the diagram illustrated in FIG. 3, E1 is the x-axis and E2 is the y-axis. The plurality of good points in grey form a cluster around the origin (0, 0) as they conform well to the two relationships, and E1 and E2 are minimized close to zero. If there is one or more sensor parameters that are anomalous, the relationship would compute a higher E1 and/or E2 for the set of parameters, resulting in the two data points in black shifting away from the cluster. This would be easily identified by the machine learning model.

Furthermore, the machine learning models will output a finalized finite error value. Depending on the model, this finalized error value could be the probability of anomaly, distance from a central cluster or a custom mathematical formula, which can be used as a performance indicator of the system, and the corresponding thresholds/range for this performance indicator can be determined via the model accuracy required.

Finally, since the coordinates of the error features derived from each good data point is optimized to be very close to the origin by default (e.g., (E1, E2, E3)=(0, 0, 0)), it is assured that the machine learning models would be able to easily separate out good points in the origin cluster from anomalous points lying far away from the cluster. This allows the present disclosure to be generalizable across different kinds of devices, parameters, and datasets regardless of the domain.

Figure 4:
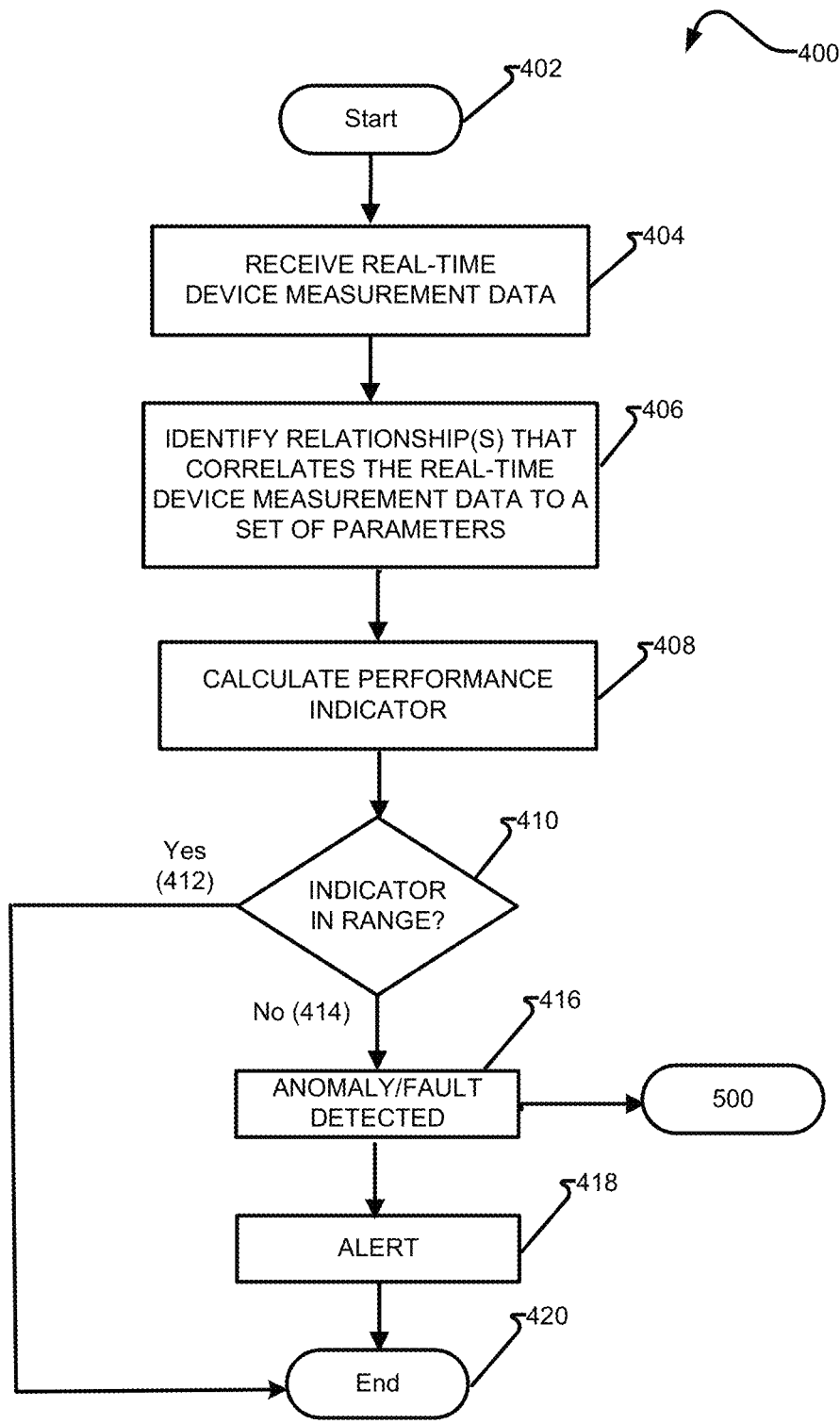
FIG. 4 illustrates a flowchart describing a method for automated fault detection in accordance with embodiments of the present disclosure.

FIG. 4 illustrates a flowchart describing a process 400 for automated fault detection in a system in accordance with embodiments of the present disclosure.

The process 400 may be embodied as machine-readable instructions maintained in a non-transitory memory that, when read by a processor such as a processor 604 of a device(s) 602 to cause the processor to execute the steps of process 400.

The process 400 starts with step 402. In step 404 real-time device measurements are received (e.g., T1-3, P1-3, and F1-3 are received from sensors 112, 114, and 116, respectively). In step 406, one or more relationships that correlates the real-time device measurements to a set of parameters is identified. For example, in the two-stage steam turbine generator, the relationship F1=F2+F3 is identified.

In step 408, the performance indicator is calculated (e.g., E1=F1−F2−F3). Ideally, E1 is zero or close to zero. Step 410 determines whether the calculated performance indicator is within a predetermined range. If (step 412 Yes) the performance indicator is within the predetermined range (e.g., $E1_{min}$-$E1_{max}$), then the process 400 ends (step 420). If (step 414 No) the performance indicator is not within the predetermined range (e.g., $E1_{min}$-$E1_{max}$), then an anomaly/fault is detected (step 416). In step 418 an alert may be triggered. In addition to triggering the alert, the device (e.g., a sensor) associated with the anomaly/fault is identified. Process 400 ends with step 420.

The steps may be performed continuously, while other steps of process 400 are executed, until the process is concluded. The process 400 may be repeated at specified time intervals.

Figure 5:
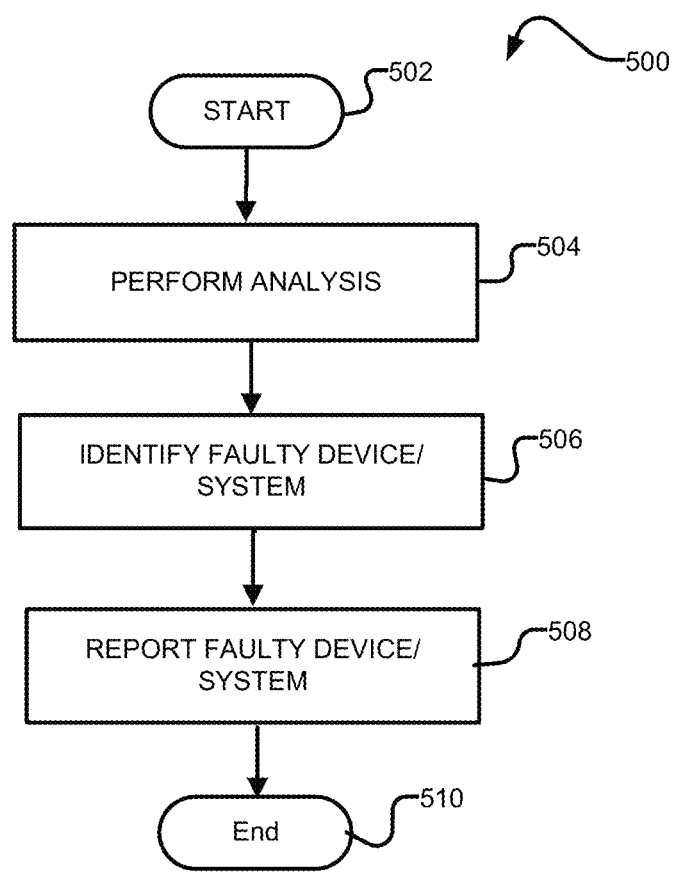
FIG. 5 illustrates a flowchart describing another method for automated fault detection in accordance with embodiments of the present disclosure.

FIG. 5 illustrates a flowchart describing another process 500 for automated fault detection in a system in accordance with embodiments of the present disclosure.

The process 500 may be embodied as machine-readable instructions maintained in a non-transitory memory that, when read by a processor such as a processor 604 of a device(s) 602 to cause the processor to execute the steps of process 500. The process 500 starts at step 502. In embodiments, the process 500 is triggered when an anomaly/fault is detected.

In step 504, an analysis using the performance indicator and the real-time device measurement data, to identify a faulty device in the system. In step 506 the anomalous/faulty device is identified. In step 508, the anomalous/faulty device is reported. The process 500 ends with step 510.

The steps may be performed continuously, while other steps of process 500 are executed, until the process is concluded.

Specifically, by monitoring the performance indicator over a preset time interval with the real-time device measurement in the system, the faulty device generating the measurement can be identified with high confidence. In a faulty device, fluctuations in its measurement will cause a corresponding change in value of the performance indicator. The impact of change can be calculated using the Pearson Correlation Coefficient between each real-time device measurement and the performance indicator. Over a period of time, this faulty device will have the greatest impact to the value of the performance indicator.

Each real-time device measurement will have a final computed value, the sum of correlations, to determine its impact on the performance indicator. The preset time interval is divided into equally spaced time intervals. For instance, if the preset time interval is 1 week, the time interval could be set at 1 hour, with a total of 24 hours*7 days=168 intervals. In every time interval of one (1) hour, the Pearson Correlation Coefficient is calculated between each real-time measurement and the performance indicator. In the case of the two-stage steam turbine generator, measurement T1 would have 168 calculations of Pearson Correlation Coefficient, which is summed up, and the absolute value is calculated to obtain the sum of correlations. This is repeated for parameters T2-3, P1-3 and Power.

In a well-functioning automation or process system with no faulty devices, each device has approximately equal impact to the performance indicator. The sum of correlations will stay small for measurements from good devices, as positive and negative correlations in the automation or process system occur in similar probabilities and cancel out. For the faulty device, the parameter value would change with greater frequency and magnitude compared to good devices. Therefore, the sum of correlations will compound and be larger, reflecting a larger impact on the performance indicator.

The sum of correlations for all measurements in the system is summed up again to obtain another value, the system sum of correlations. For each sum of correlation from a measurement, it is divided by the system sum of correlations to determine the percentage impact of that measurement. For a ten-parameter system such as the two-stage steam turbine generator, the expected percentage impact is $$\frac{100\%}{\text{No. of parameters}} = \frac{100\%}{10} = 10\%.$$

If any measurement stems from a faulty device, the percentage impact would be significantly greater than the expected percentage impact. A percentage threshold is set for the automation or process system, such as three times the expected percentage impact, which is 10%×3=30% in this example. To identify the faulty device, the corresponding measurement in the system, such as T1, will have the largest percentage impact out of the ten parameters/measurements, and exceed the percentage threshold of 30%.

Figure 6:
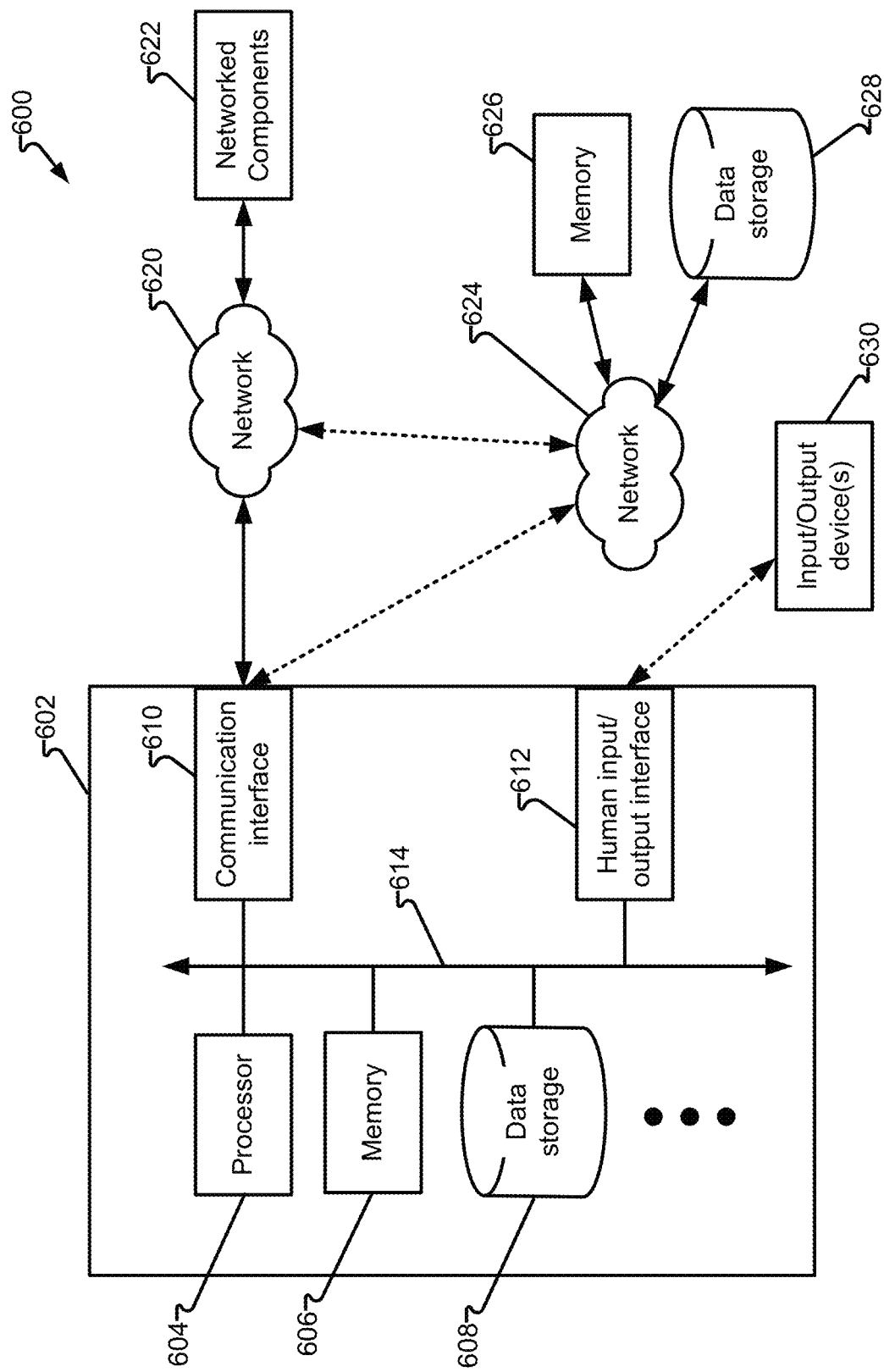
FIG. 6 illustrates an example computing system configured to implement the methods in accordance with embodiments of the present disclosure.

FIG. 6 depicts device 602 in system 600 in accordance with embodiments of the present disclosure. Device 602 may be an example of the fault detection system 102.

The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614.

In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally, or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or utilize one or more networks, such as network 620 and/or network 624.

Network 620 may be a wired network (e.g., Ethernet), wireless (e.g., Wi-Fi, Bluetooth, cellular, etc.) network, or combination thereof and enable device 602 to communicate with networked component(s) 622 (e.g., automation system). In other embodiments, network 620 may be embodied, in whole or in part, as a telephony network (e.g., public switched telephone network (PSTN), private branch exchange (PBX), cellular telephony network, etc.).

Additionally, or alternatively, one or more other networks may be utilized. For example, network 624 may represent a second network, which may facilitate communication with components utilized by device 602. For example, network 624 may be an internal network to a business entity or other organization, whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally, or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion coprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARIV1926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclose methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to perform automated fault detection of a power system, wherein the power system includes a multi-stage power generator, a plurality of input and/or output devices, and a plurality of sensors positioned at the plurality of input and/or output devices, the method comprising:
    generating, by the plurality of sensors, real-time device measurement data from the plurality of input and/or output devices in the power system, wherein the real-time device measurement data includes real-time measurements for a set of parameters measured within the power system;
    identifying at least one relationship for the set of parameters, wherein each of the at least one relationship comprises a correlation between selected parameters within the set of parameters that holds true when the power system is operating optimally, and wherein the at least one relationship is used to train an anomaly detection algorithm with a reduced data set compared to training the anomaly detection algorithm with individual values from the plurality of input and/or output devices;
    calculating, for one or more relationships in the at least one relationship, an error feature using the real-time measurements for the set of parameters, wherein the error feature is indicative of a possible anomaly within the power system;
    in response to determining that the error feature is outside a predetermined range, detecting an anomaly in the power system, wherein the predetermined range is determined in accordance with an accuracy rate of determining normality or anomaly;
    in response to detecting the anomaly, performing an analysis using the error feature and the real-time device measurement data, to identify a faulty device in the power system, wherein the analysis includes applying a changing time window to determine a Pearson Correlation Coefficient between the real-time device measurement data and the error feature across at least one time interval; and
    triggering an alert in response to identifying the faulty device.

2. The method as claimed in claim 1, wherein the set of parameters relate to at least one of the following: flow, temperature, pressure, chemical concentration, PH value and/or power, and wherein the at least one relationship comprises a custom mathematical formula, and wherein the error feature is derived from the custom mathematical formula.

3. The method as claimed in claim 1, wherein the set of parameters comprises simulated device measurements, and wherein the analysis comprises determining that the error feature increases over time.

4. The method as claimed in claim 1, wherein a second error feature is based on at least one second relationship, wherein the anomaly is detected based on a coordinate determined by the error feature and the second error feature.

5. The method as claimed in claim 1, wherein at least one of the plurality of sensors comprises at least one of: a temperature sensor, a pressure sensor, or a flow sensor.

6. The method as claimed in claim 1, wherein the at least one relationship has an associated average error near zero.

7. The method as claimed in claim 1, wherein the set of parameters are determined based on principles including at least one of: mass balance and energy balance.

8. The method as claimed in claim 1, wherein at least one of the plurality of input and/or output devices has a parameter with an expected operating range, and wherein calculating the error feature enables more accurate detection of the anomaly when the parameter is outside the expected operating range compared to a method that does not calculate the error feature.

9. The method as claimed in claim 1, wherein the multi-stage power generator comprises:
    a two-stage steam turbine generator system,
    wherein each of the sensors is configured to output sensor signals that represent respective ones of the individual values from the plurality of input and/or output devices, and wherein training the anomaly detection algorithm with the individual values is less efficient than training the anomaly detection algorithm using the at least one relationship.

10. The method as claimed in claim 1, wherein the multi-stage power generator comprises one of: a hydroelectric machine, a steam turbine, a wind turbine, a compressor, or a pump.

11. The method of claim 1, wherein a percentage impact of the error feature is determined based on an absolute value of a sum of Pearson Correlation Coefficients determined over the at least one time interval.

12. The method of claim 11, wherein the faulty device is identified based on the percentage impact and an expected percentage impact.

13. The method of claim 1, wherein the at least one relationship is determined by comparing a magnitude of an average value of the error feature and a distribution of values of the error feature across a plurality of data points for a time interval.

14. A method to perform automated monitoring of a power system, wherein the power system includes a multi-stage power generator, a plurality of input and/or output devices, and a plurality of sensors positioned at the plurality of input and/or output devices, the method comprising:
    generating, by the plurality of sensors, real-time device measurement data from the plurality of input and/or output devices in the power system, wherein the real-time device measurement data includes real-time measurements for a set of parameters measured within the power system;
    identifying at least one relationship for the set of parameters, wherein each of the at least one relationship comprises a correlation between selected parameters within the set of parameters that holds true when the power system is operating optimally, and wherein the at least one relationship is used to train an anomaly detection algorithm with a reduced data set compared to training the anomaly detection algorithm with individual values from the plurality of input and/or output devices;

calculating, for one or more relationships in the at least one relationship, an error feature using the real-time measurements for the set of parameters, wherein the error feature is indicative of a possible anomaly within the power system;

in response to determining that the error feature is outside a predetermined range, detecting an anomaly in the power system, wherein the predetermined range is determined in accordance with an accuracy rate of determining normality or anomaly;

performing an analysis using the error feature and the real-time device measurement data to identify a faulty device among the plurality of input and/or output devices, wherein the analysis includes applying a changing time window to determine a Pearson Correlation Coefficient between the real-time device measurement data and the error feature across at least one time interval; and triggering an alert in response to identifying the faulty device.

15. A power system, comprising:
a two-stage steam turbine generator;
a plurality of input/output devices;
a plurality of sensors positioned at the plurality of input/output devices for measuring a set of real-time parameters; and
a processor configured to:
construct a series of relationships that models optimal operation of the power system for the set of real-time parameters so as to generate a set of intermediate features that comprises a more manageable dataset for training a machine learning model compared to training the machine learning model with individual values from the plurality of input/output devices;
compute, for one or more of the relationships, an error feature that is indicative of a possible anomaly within the power system;
trigger an anomaly alert when the error feature is outside a predetermined range, wherein the predetermined range is determined in accordance with an accuracy rate of determining normality or anomaly; and
perform an analysis using the error feature and real-time device measurement data measured for the set of real-time parameters to identify a faulty device among the plurality of input/output devices, wherein the analysis includes applying a changing time window to determine a Pearson Correlation Coefficient between the real-time device measurement data and the error feature across at least one time interval.

16. The power system of claim 15, wherein the two-stage steam turbine generator comprises an inlet and an outlet, and wherein a first set of the plurality of sensors are configured to measure at least one of temperature, pressure, or flow at the inlet and the outlet.

17. The power system of claim 15, wherein the plurality of sensors comprises a first power sensor at a first stage and a second power sensor at a second stage for measuring a first real time power value of the first stage and a second real time value of the second stage.

18. The method of claim 1, wherein each parameter within the set of parameters comprises an operating range that is reflected in the at least one relationship.

19. The method of claim 18, wherein a new state of a parameter within the operating range is reflected in the at least one relationship.

* * * * *